Sept. 18, 1945. M. C. DEPP 2,384,819
FLUX VALVE
Filed Jan. 19, 1943

INVENTOR
M. C. DEPP
BY Herbert H. Thompson
his ATTORNEY

Patented Sept. 18, 1945

2,384,819

UNITED STATES PATENT OFFICE 2,384,819

FLUX VALVE

Marlin C. Depp, Hempstead, N. Y., assignor to Sperry Gyroscope Company, Inc., Brooklyn, N. Y., a corporation of New York Application January 19, 1943, Serial No. 472,911

10 Claims. (Cl. 177—380)

My invention particularly relates to a flux valve which is characterized by the facts that its signal output is substantially undistorted; that the reluctance of the permeable core thereof remains substantially constant for all azimuthal positions thereof; and the essential number of core parts is reduced to a minimum.

It is a first object of my invention to provide a flux valve in which the fundamental of the exciting frequency in the pick-up windings will be substantially zero, whereby distortion of the signal output from the valve is practically eliminated.

A further object resides in providing a flux valve in which the saturable core is arranged in the form of or to lie along the sides of a closed polygonal frame, insofar as the excitation flux is concerned.

Still another object resides in providing a flux valve having a core arranged in the foregoing manner but in which the core parts are reduced to a minimum while providing a circuitous path for the flow of flux about the geometrical figure formed thereby and in which substantially straight flat core sections may be used which may be readily selected for uniform permeability characteristics. The design which has a minimum of parts, particularly that of Fig. 5 herein where collector horns are eliminated and the vertexes left open, is most advantageous when matched core components are used. The use of matched components is of extreme importance if control is to be had over the response of a magnetic field receiver.

With these and other objects in view, my invention will best be understood by reference to the accompanying drawing in which preferred embodiments thereof have been shown, and in which—

Figure 1:
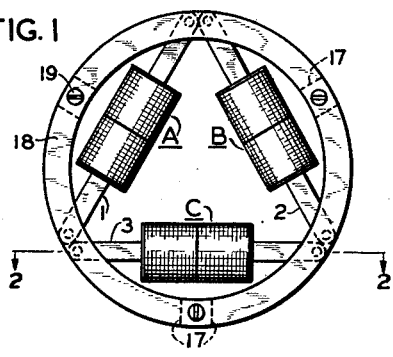
Fig. 1 is a plan view of a preferred form of flux valve.
Figure 3:
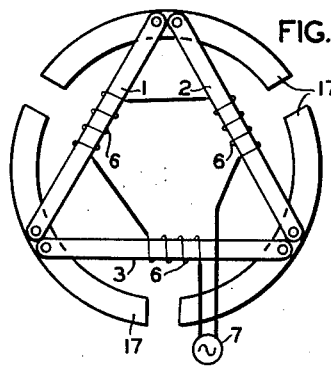
Figure 2:
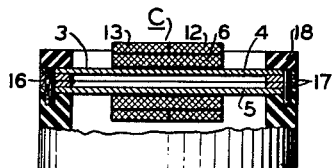
Fig. 2 is a sectional elevation view of the flux valve of Fig. 1 taken in about the plane 2—2 thereof.
Figure 4:
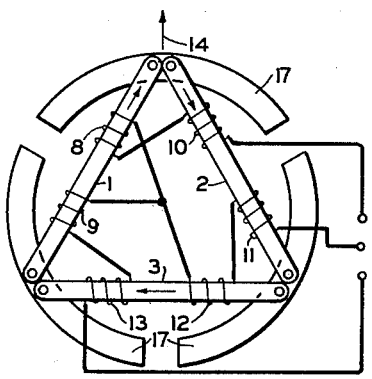
Figure 5:
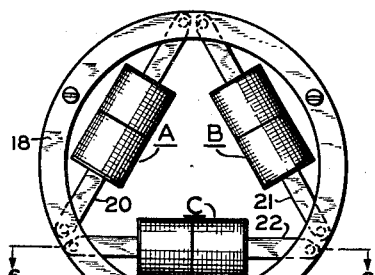
Figure 7:
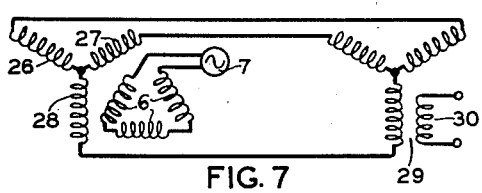
Figure 6:
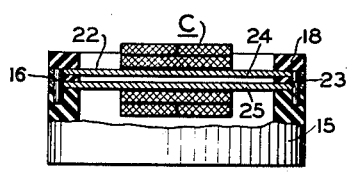

Figs. 3 and 4 schematically represent the magnetic and electrical circuits of the flux valve of Fig 1;

Fig. 5 is a plan view similar to Fig. 1 but showing a modification;

Fig. 6 is a sectional elevation view of the flux valve of Fig. 5 taken in about the plane 6—6 thereof; and Fig. 7 is an exemplary wiring diagram showing the flux valve connected to a receiver unit.

Since my invention contemplates the use of a core in the form of a closed polygonal frame and particularly in the form of a closed triangular frame, I have shown in the drawing the preferred triangular form.

The triangular core flux valve is considered most desirable because its core parts are a minimum in number thereby affording close matching of the core parts and because an acute angle is formed between adjacent core legs providing the most favorable relative disposition of pick-up coils when interconnected in the manner hereinafter described. It is pointed out that the core may be arranged in the form of a polygon having a greater number of sides but the triangular form is considered most advantageous for the above reasons alone. Further, in a case where the polygon is not physically complete, as in Fig. 5 where the vertexes are open, it will be understood that the polygon is substantially magnetically complete insofar as the exciting magnetomotive force is concerned.

Referring to Fig. 1, I have illustrated my preferred form of flux valve as comprising a core arranged in the form of a closed equilateral triangular frame. The legs thereof may be integral, but for the purposes of illustration I have shown the core as comprising legs 1, 2, and 3 of magnetic, highly permeable material. These legs are arranged in contact with each other at the vertexes of the triangle and therefore provide a continuous path for the circulation of flux thereabout. Upon each core leg, each of which, in the embodiment shown, comprises two strips or laminations 4 and 5, is mounted an exciting coil 6, and about each exciting coil is wound two pick-off coils as represented generally at A, B and C, respectively, in the drawing.

By referring to Fig. 3, it will be seen that the exciting coils 6 are connected in series, but they may be connected in parallel, and they are connected to a source of pulsating, periodically varying or alternating, exciting current 7.

The preferred arrangement of pick-up coils and one manner of interconnection thereof is shown in Fig. 4. Core leg 1 carries two pick-up windings 8 and 9, while core leg 2 carries the pair of pick-up windings 10 and 11, and leg 3 carries the windings 12 and 13. In accordance with my invention, one coil of each pair is connected with the coil of another pair on an adjacent leg of the core. In other words, coils 8 and 10 are connected together and, similarly, coils 11 and 12 and also coils 9 and 13. The coils so connected together may be considered as pairs and the pairs so formed may be connected in multicircuit or polycircuit fashion as, for example, Y-connected as shown in the drawing. However, the coils of each of these pairs, such as coils 8 and 10, are connected in series bucking relation or in voltage opposition relation as far as the exciting flux produced by the exciting coils 6 in the core is concerned. In other words, the flux in the core produced by exciting winding 6 will flow in the same direction about the triangular frame for any instantaneous value thereof. This flux induces potentials or currents in the pick-up windings, and each pair of pick-up windings are so connected together that these induced potentials oppose each other and cancel out, thereby eliminating the fundamental frequency of the exciting current in the output of the pick-up coils.

However, it will be observed that, assuming an external magnetic field such as the earth's field extends in the direction of the arrow 14 in Fig. 4 and that the flux valve is subjected thereto, then the flux induced in the legs 1 and 2 of the core by said field will flow in relatively opposite directions in these core legs, and therefore the potentials induced in the pair of coils 8 and 10 will be additive due to the manner of connection of these coils, and an output signal will result. Since all three pairs of pick-up coils are arranged as above described, each pair will function in the above manner to cancel out the fundamental frequency and supply a substantially undistorted signal output when properly positioned in and subjected to an external magnetic field.

In the form of my invention shown in Figs. 1 through 4, the laminations of each core leg are supported in a casing 15 of non-magnetic material, the laminations being positioned by means of pins 16 and being connected with collector horns 17 which may lie between the annular rim of casing 15 and a clamping ring 18. The ring 18 may be secured by studs 19 passing between the spaced ends of the collector horns 17 and serving securely to hold the legs of the core in position in said casing.

It will be observed that a flux valve arranged in the manner above described provides an easily manufactured device and one which has highly desirable characteristics. For example, the three legs of the core may be formed of substantially flat, thin permeable strips and being a minimum in number may be quite readily matched in their permeability characteristics. Furthermore, since the core is in the form of a closed polygon, its magnetic path is one of substantially constant reluctance for any position thereof in azimuth relative to an external magnetic field.

Although I have shown the flux valve as comprising collector horns, they may be dispensed with since the core itself may perform the function of such collectors. Figs. 5 and 6 disclose a flux valve which does not embody such collector horns.

In Fig. 5 I have shown a modification of my flux valve wherein the legs 20, 21 and 22 are arranged to lie along the sides of a closed triangular frame but in which the legs are slightly spaced from each other at the vertexes of the triangle. By this relative arrangement of core pieces, I avoid any disturbances in the core circuit which may arise from contact between adjacent core parts. In this embodiment each leg may comprise one or more laminations arranged in superimposed position and in contact with each other, or the laminations may be vertically spaced as shown in Fig. 6 wherein insulators 23 are shown inserted between the laminations 24 and 25 of a core leg. By spacing these laminations in this manner, I may further prevent disturbances in the magnetic characteristics of the core, which disturbances may otherwise be caused by the engagement of the laminations of each leg of the core with each other.

In Fig. 7, I have illustrated one manner in which the flux valve may be operatively connected with a receiver for the signals induced therein. The windings 26, 27 and 28 represent the pairs of windings 8 and 10, 11 and 12, and 9 and 13, respectively. These windings are Y-connected as above described, and the outputs thereof are connected with the Y-connected polycircuit windings of a receiver 29 which may be of the "Autosyn" or "Selsyn" type. If phase sensitivity is desired, current of twice the frequency of the source 7 is supplied to the single phase winding 30 of the receiver. The requirement for such double frequency excitation is believed well known in the art and will require no discussion herein. Device 29 may, of course, be employed as a signal transformer to provide a signal output from the single phase winding 30 as when used with a gyro-magnetic compass.

Besides the fact that a flux valve of the type herein described is endowed with highly desirable operating characteristics, it is also quite advantageous from a manufacturing viewpoint. For example, the core pieces, each made in separate units, may be readily chosen for their magnetic properties; the exciting windings may be form wound and slipped over the core pieces and the pick-up windings wound thereabout with, of course, insulation between the respective windings and the core, and each leg may then be considered as a unit and readily mounted in the casing therefor in the manner hereinbefore described.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A flux valve sensitive to an external magnetic field and comprising a magnetically permeable core arranged to form a circuitous flux path of polygonal form, means for producing in said core a periodically varying, exciting flux having the same direction about said core for any instantaneous value thereof, and a plurality of pairs of pick-up coils mounted on said core, two of said pick-up coils being mounted on each zone of said core forming a side of said polygon and each coil of a pair being mounted on said core respectively in zones thereof forming adjacent sides of the polygon and being connected together to oppose the voltages induced therein by said exciting flux.

2. A flux valve sensitive to an external magnetic field and comprising a core having the magnetically permeable core portions thereof arranged in the relationship of and to lie along each side, respectively, of a closed polygonal frame, means for producing in said core portions a periodically varying flux circulating in the same direction about said frame for any instantaneous value thereof, and a plurality of pairs of pick-up coils mounted on said core portions, two of said pick-up coils being mounted on each side of said frame and each coil of a pair being mounted respectively on adjacent sides of said frame and being connected together to oppose the voltages induced therein by said varying flux.

3. A flux valve sensitive to an external magnetic field and comprising magnetically permeable core pieces arranged to form a closed triangular frame, means for producing in said core pieces a periodically varying flux flowing in the same direction about said frame for any instantaneous value thereof, and a plurality of pairs of pick-up coils, two of said pick-up coils being mounted on each of the core pieces forming the sides of said frame and each coil of a pair being mounted respectively on adjacent sides of said frame and being connected together to oppose the voltages induced therein by said varying flux.

4. A flux valve sensitive to an external magnetic field and comprising magnetically permeable core pieces relatively arranged in the manner of sides of a closed polygonal frame but being relatively spaced at the apexes of said frame, exciting coils operatively associated with each core piece and a source of periodically varying energy to produce in said core pieces a periodically varying flux flowing in the same direction about said frame for any instantaneous value thereof, and a plurality of pairs of pick-up coils mounted on said core pieces, two of said pick-up coils being mounted on each core piece and each coil of a pair being mounted respectively on adjacent core pieces and being connected together to oppose the voltages induced therein by said varying flux.

5. A flux valve sensitive to an external magnetic field and comprising a core having magnetically permeable core portions arranged in the relationship of and to lie along each side, respectively, of a triangle, exciting coils mounted on said core and a source of periodically varying energy therefor for producing in said core portions a periodically varying flux flowing in the same direction about said triangle for any instantaneous value thereof, and a plurality of pairs of pick-up coils mounted on said core portions, two of said pick-up coils being mounted on each of said core portions and each coil of a pair being mounted on adjacent sides of said triangle and being connected together to oppose the voltages induced therein by said varying flux.

6. A flux valve sensitive to an external magnetic field and comprising a core having the magnetically permeable core portions thereof arranged in the relationship of and to lie along each side, respectively, of a closed polygonal frame, each core portion including a pair of substantially parallelly extending, slightly spaced core elements, means for producing in said core portions a periodically varying flux flowing in the same direction about said frame for any instantaneous value thereof, and a plurality of pairs of pick-up coils mounted on said core portions, each coil of a pair being mounted respectively on adjacent sides of said frame and being connected together to oppose the voltages induced therein by said varying flux.

7. A flux valve sensitive to an external magnetic field and comprising a core formed of a plurality of magnetically permeable core pieces arranged in the relationship of and to lie along each side, respectively, of a closed triangular frame, a non-magnetic base member for supporting the core pieces in said relationship, each of said core pieces having an exciting coil wound thereabout and a pair of pick-up coils mounted thereon and each core piece and its associated coils forming a unitary component part of said valve, the pick-up coils of each unit being connected respectively to the pick-up coils of adjacent units to oppose the voltages induced therein from said exciting coils.

8. A flux valve sensitive to an external magnetic field and of the character recited in claim 6, in which the polygonal frame is triangular.

9. A flux valve sensitive to an external magnetic field and comprising magnetically permeable core pieces relatively arranged in the manner of sides of a closed polygonal frame, but being relatively spaced at the apexes of said frame, means for producing in said core pieces a periodically varying exciting flux flowing in the same direction about said frame for any given instantaneous value thereof, and a plurality of pairs of pick-up coils mounted on said core pieces, two of said pick-up coils being mounted on each core piece and each coil of a pair being mounted respectively on adjacent core pieces and being connected together to oppose the voltages induced therein by said exciting flux.

10. A flux valve sensitive to an external magnetic field and of the character recited in claim 9, in which the polygonal frame is triangular.

MARLIN C. DEPP.